(12) United States Patent
Jeter, Jr. et al.

(10) Patent No.: US 7,257,681 B2
(45) Date of Patent: Aug. 14, 2007

(54) MAINTAINING ENTITY ORDER WITH GATE MANAGERS

(75) Inventors: Robert E. Jeter, Jr., Morrisville, NC (US); John A. Chanak, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 393 days.

(21) Appl. No.: 10/458,869

(22) Filed: Jun. 11, 2003

(65) Prior Publication Data

US 2004/0252710 A1 Dec. 16, 2004

(51) Int. Cl.
*G06F 12/00* (2006.01)
(52) U.S. Cl. .......................... 711/150; 709/238; 710/52
(58) Field of Classification Search ........ 711/147–152, 711/163, 164; 370/341–430
See application file for complete search history.

(56) References Cited

U.S. PATENT DOCUMENTS

| 6,026,464 | A | 2/2000 | Cohen |
| 6,119,215 | A | 9/2000 | Key et al. |
| 6,230,241 | B1 | 5/2001 | McKenney |
| 6,272,621 | B1 | 8/2001 | Key et al. |
| 6,330,645 | B1 | 12/2001 | Harriman |
| 2002/0118692 | A1* | 8/2002 | Oberman et al. ........... 370/419 |
| 2004/0186945 | A1* | 9/2004 | Jeter et al. .................... 711/5 |

FOREIGN PATENT DOCUMENTS

WO WO 02/29511 A2 11/2002

OTHER PUBLICATIONS

Bux et al., "Technologies and Building Blocks for Fast Packet Forwarding", IEEE Communications Magazine, pp. 70-77, Jan. 2001.
"Notification of Transmittal of The International Search Report and The Written Opinion of the International Searching Authority, or the Declaration", Internation Application No. PCT/US2004/018723, with an International Filing Date of Oct. 6, 2004.
"Written Opinion of the International Searching Authority" International Application No. PCT/US2004/018723, with an International Filgn Date of Oct. 6, 2004.
Minkenberg, Cyriel, et al., "A Combined Input and Output Queued Packet-Switched System Based on PRIZMA Switch-on-a-chip Technoloogy", IEEE Communications Magazine, XP001003379, Dec. 2000, pp. 70-77.

* cited by examiner

*Primary Examiner*—Brian R. Peugh
*Assistant Examiner*—Jesse Diller
(74) *Attorney, Agent, or Firm*—Cesari and McKenna LLP (57) ABSTRACT

A technique for maintaining order among a plurality of entities contained in an intermediate node by ensuring orderly access to a resource shared by the entities. A request is generated to access the resource. The request is placed on a queue associated with an entity. The request eventually reaches the head of the queue. An identifier generated by a gate manager is compared with an identifier associated with the queue to determine if they match. If so, the request is transferred to the resource, which processes the request. Results acquired from the resource (if any) are transferred to the entity.

21 Claims, 10 Drawing Sheets

MAINTAINING ENTITY ORDER WITH GATE MANAGERS

BACKGROUND OF THE INVENTION

1. Field of the Invention

The present invention relates to computer networking and in particular to maintaining entity order in a system containing multiple entities.

2. Background Information

Computer architecture generally defines the functional operation, including the flow of information and control, among individual hardware units of a computer. One such hardware unit is the processor or processing engine, which contains arithmetic and logic processing circuits organized as a set of data paths. In some implementations, the data path circuits may be configured as a central processing unit (CPU) having operations that are defined by a set of instructions. The instructions are typically stored in an instruction memory and specify a set of hardware functions that are available on the CPU.

A high-performance computer may be realized by using a number of CPUs or processors to perform certain tasks in parallel. For a purely parallel multiprocessor architecture, each processor may have shared or private access to resources, such as an external memory coupled to the processors. Access to the external memory is generally handled by a memory controller, which accepts requests from the various processors to access the external memory and processes them in an order that typically is controlled by the memory controller. Certain complex multiprocessor systems may employ many memory controllers where each controller is attached to a separate external memory subsystem.

One place where a parallel multiprocessor architecture may be advantageously employed involves the area of data communications and, in particular, the forwarding engine for an intermediate network station or node, such as a router or switch. An intermediate node interconnects communication links and sub-networks of a computer network through a series of ports to enable the exchange of data between two or more software entities executing on hardware platforms, such as end nodes. The nodes typically communicate by exchanging discrete packets or frames of data according to predefined protocols, such as the Transmission Control Protocol/Internet Protocol (TCP/IP) or the Internetwork Packet Exchange (IPX) protocol. The forwarding engine is often used by the intermediate node to process packets acquired on the various ports in accordance with various predefined protocols. This processing may include placing a packet in a packet memory where the forwarding engine may access data associated with the packet and perform various functions on the data such as, modifying the contents of the packet.

In some intermediate nodes, the multiprocessor forwarding engine is organized as a systolic array comprising "m" rows and "n" columns of entities, such as processors or threads. Here, the entities of each row may be configured to process packets in a pipeline fashion, wherein the entities of each column in the row acts as a stage in the pipeline and performs a particular function on the packets. For example, an 8×2 systolic array of processors comprises 16 processors organized as 8 rows containing 2 columns per row wherein the column processors of each row comprise a 2-stage pipeline.

Usually, packets are processed by the systolic array in a manner where a packet is assigned to a particular row of entities and each entity in a column is configured to perform a function on the packet in a manner as described above. For example, in the 8×2 array described above, the intermediate node acquires a packet and assigns the packet to a particular row of processors in the array. The processor in the first column of the row may be configured to apply a destination address contained in the packet to a look-up table to determine the destination of the packet. The processor in the second column may be configured to place the packet on an output queue associated with the destination.

In a typical systolic array configuration, each entity in a particular column is configured to execute the same code within a fixed amount of time but with a shifted phase. As packets are acquired, they are placed in a shared resource, such as an external memory, and assigned to the next available row of entities, as described above. In this configuration, packets tend to be processed by the intermediate node on a first-in first-out basis such that packets that arrive ahead of later packets exit the forwarding engine ahead of the later packets. However, due to loss of entity order caused by various events associated with accessing the shared resource, it may be possible for packets that arrive later to exit ahead of packets that arrived earlier.

For example in a systolic array configuration comprising processors, the processors of a particular row processing an earlier acquired packet may stall due to various memory events associated with the shared resource, such as memory refresh cycles or being denied access to locked memory locations. Thus, the time spent processing the earlier packet may take longer than the time spent processing a later acquired packet processed by a different row of processors and, consequently, the later acquired packet may end up exiting the forwarding engine ahead of the earlier acquired packet.

One way to maintain entity order and consequently packet processing order is to employ a synchronization mechanism that synchronizes the entities in the systolic array at certain points during their processing of packets. A prior art synchronization mechanism that may be used involves a special instruction called a "boundary synchronize" (BSYNC) instruction. The BSYNC instruction causes the entities in a particular column to wait (stall) until all the processors in the column have executed the instruction. In a typical arrangement, code executed by the column of entities contains BSYNC instructions at various strategic points in the code. When an entity, such as a processor, executes the BSYNC instruction, the processor's hardware causes the processor to stall until all the other processors in the same column have executed their BSYNC instructions at which time all the processors continue execution with their next instruction. The BSYNC instruction acts to synchronize the entities at certain code boundaries, and can be used to prevent entities that are processing later acquired packets from "getting ahead" of entities processing earlier acquired packets.

While the above-described technique may be effective at ensuring that entity and packet-processing order is maintained, the technique has its drawbacks. For example, each entity must execute an instruction in order to synchronize and maintain order. This wastes valuable time that may be better utilized processing packets. Moreover, an entity may become stalled while waiting for slower entities to execute the synchronize instruction. This too wastes valuable time and may act to further diminish the entity's capacity to process packets.

SUMMARY OF THE INVENTION

The present invention relates to an efficient technique for maintaining order among entities of an intermediate network node by ensuring orderly access to a resource shared by the entities. According to the technique, a request is generated by an entity to access the resource. The request is placed on a queue associated with the entity. Each queue is further associated with an identifier (ID) that illustratively represents the entity associated with the queue. The request eventually reaches the head of the queue. Notably, a gate manager is provided to maintain orderly access to the shared resource. To that end, the gate manager generates an ID that illustratively represents an entity allowed to access the resource. The ID generated by the gate manager is compared with the ID associated with the queue to determine if they match. If so, the request is transferred to the resource, which processes the request. Results acquired from the resource (if any) are transferred to the entity.

In the illustrative embodiment, the entities, such as processors or threads of execution, access resources, such as external memories, via resource controllers, such as memory controllers coupled to the processors and external memories. The memory controllers contain gate managers that are used to maintain orderly access to the memories. A processor accesses a memory by generating a request and transferring the request to the memory controller coupled to the memory. The request is placed on a request queue associated with the processor. The request queue is associated with an ID that represents the processor. A gate manager ID specified by the processor and contained in the request identifies a gate manager contained in the memory controller. When the request reaches the head of the queue, an arbiter of the memory controller determines if the ID generated by the specified gate manager is the same as (matches) the ID associated with the queue. If so, the memory controller removes the request from the queue and issues the request to the memory. The memory processes the request and returns results (if any) to the memory controller, which transfers the results to the processor.

Advantageously, the inventive technique is an improvement over prior techniques in that entity order can be maintained in a system containing multiple entities without requiring intervention on the part of the entities.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
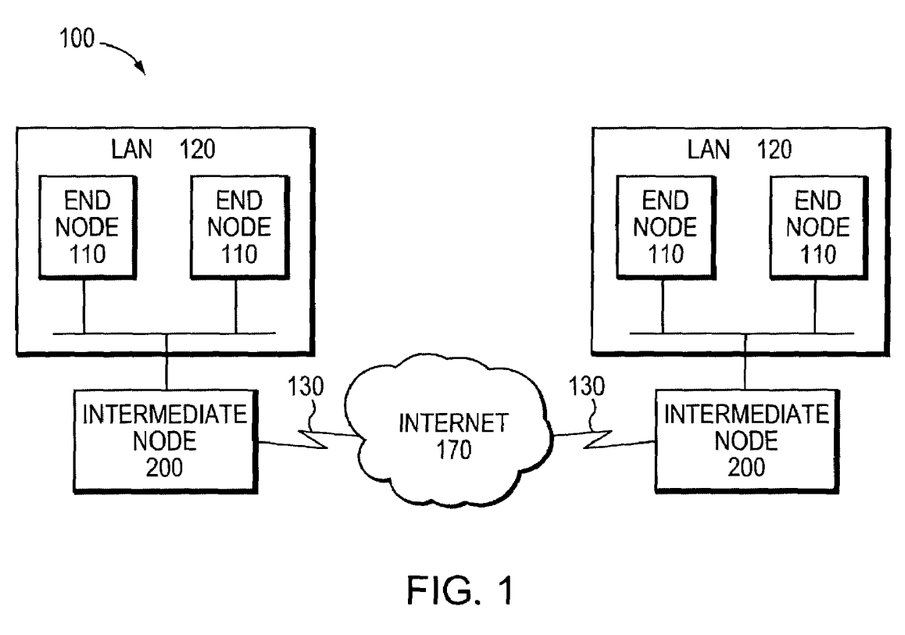
FIG. 1 is a schematic block diagram of a computer network comprising a collection of interconnected communication media attached to a plurality of nodes that may be advantageously used with the present invention.

FIG. 1 is a schematic block diagram of a computer network 100 that may be advantageously used with the present invention. The computer network 100 comprises a collection of communication links and segments connected to a plurality of nodes, such as end nodes 110 and intermediate network nodes 200. The network links and segments may comprise local area networks (LANs) 120, wide area networks (WANs), such as Internet 170 and WAN links 130 interconnected by intermediate nodes 200 to form an internetwork of computer nodes. These internetworked nodes communicate by exchanging data packets according to a predefined set of protocols, such as the Transmission Control Protocol/Internet Protocol (TCP/IP) and the Internetwork Packet eXchange (IPX) protocol.

Figure 2:
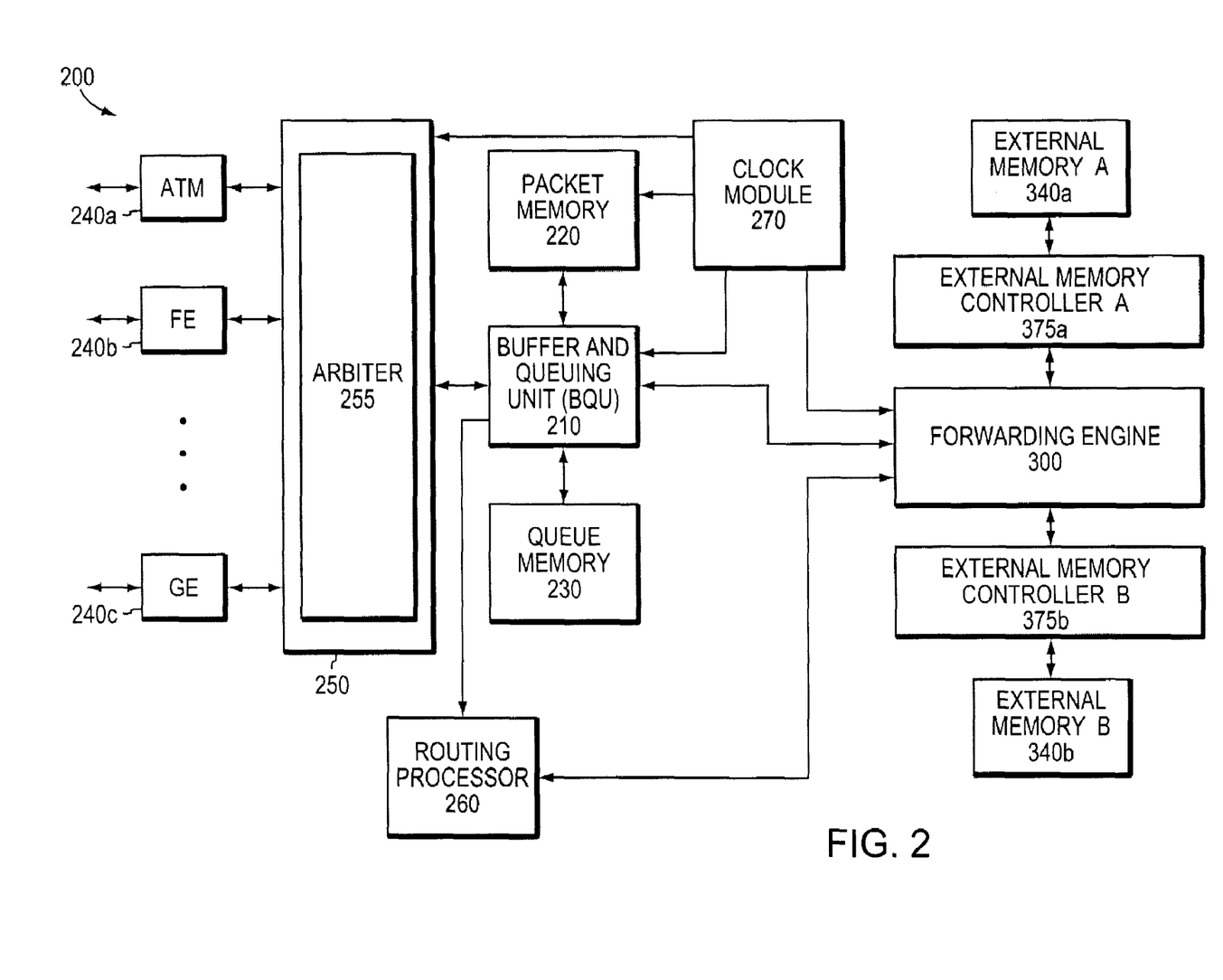
FIG. 2 is a high-level schematic block diagram of an intermediate node that may be advantageously used with the present invention.

FIG. 2 is a high-level schematic block diagram of intermediate node 200, which illustratively is a router. An example of a router that may be advantageously used with the present invention is the Cisco 10000 Series Internet Router available from Cisco Systems Incorporated, San Jose, Calif. Node 200 comprises a plurality of interconnected components including a forwarding engine 300, various memories, queuing logic 210, and network interface cards (line cards) 240. Operations of these components are preferably synchronously controlled by a clock module 270 although the arrayed elements of the forwarding engine 300 may be operatively configured to function asynchronously. In the illustrative embodiment, the clock module 270 generates clock signals at a frequency of, e.g., 200 megahertz (i.e., 5 nanosecond clock cycles), and globally distributes them via clock lines to the components of the intermediate node 200.

The memories generally comprise random-access-memory (RAM) storage locations addressable by the forwarding engine 300 and logic for storing data structures accessed by the components and software programs including programs that may implement aspects of the present invention. An operating system, portions of which are typically resident in memory and executed by the forwarding engine 300, functionally organizes node 200 by, inter alia, invoking network operations in support of software processes executing on node 200. It will be apparent to those skilled in the art that other memory means, including various computer readable media, may be used for storing and executing program instructions pertaining to the inventive technique and mechanism described herein.

The buffer and queuing unit (BQU) 210 is connected to a packet memory 220 that is configured to store packets, and a queue memory 230 that is configured to store network and link layer headers of the packets in data structures, such as linked lists, organized as queues. The BQU 210 further comprises interface circuitry for interconnecting the forwarding engine 300 with a plurality of line cards 240 via a selector circuit 250 having an arbiter 255. The line cards 240 may comprise, e.g., Asynchronous Transfer Mode (ATM), Fast Ethernet (FE) and Gigabit Ethernet (GE) ports, each of which includes conventional interface circuitry that may incorporate the signal, electrical and mechanical characteristics, and interchange circuits, needed to interface with the physical media and protocols running over that media.

A routing processor 260 executes conventional routing protocols for communication directly with the forwarding engine 300. The routing protocols generally comprise topological information exchanges between intermediate nodes to determine preferred paths through the network based on, e.g., destination IP addresses. These protocols provide information used by the processor 260 to create and maintain forwarding tables. The tables are loaded into the external memories 340 as forwarding information base (FIB) tables, used by the engine 300 to perform, e.g., layer-2 (L2) and layer-3 (L3) forwarding operations. When processing a header associated with a packet in accordance with IP routing, for example, engine 300 determines where to send the packet by indexing into the FIB using a destination IP address contained in the header. Execution of the forwarding operations may result in destination media access control (MAC) addresses of the headers being rewritten by the forwarding engine 300 to identify output ports for the packets.

Figure 3:
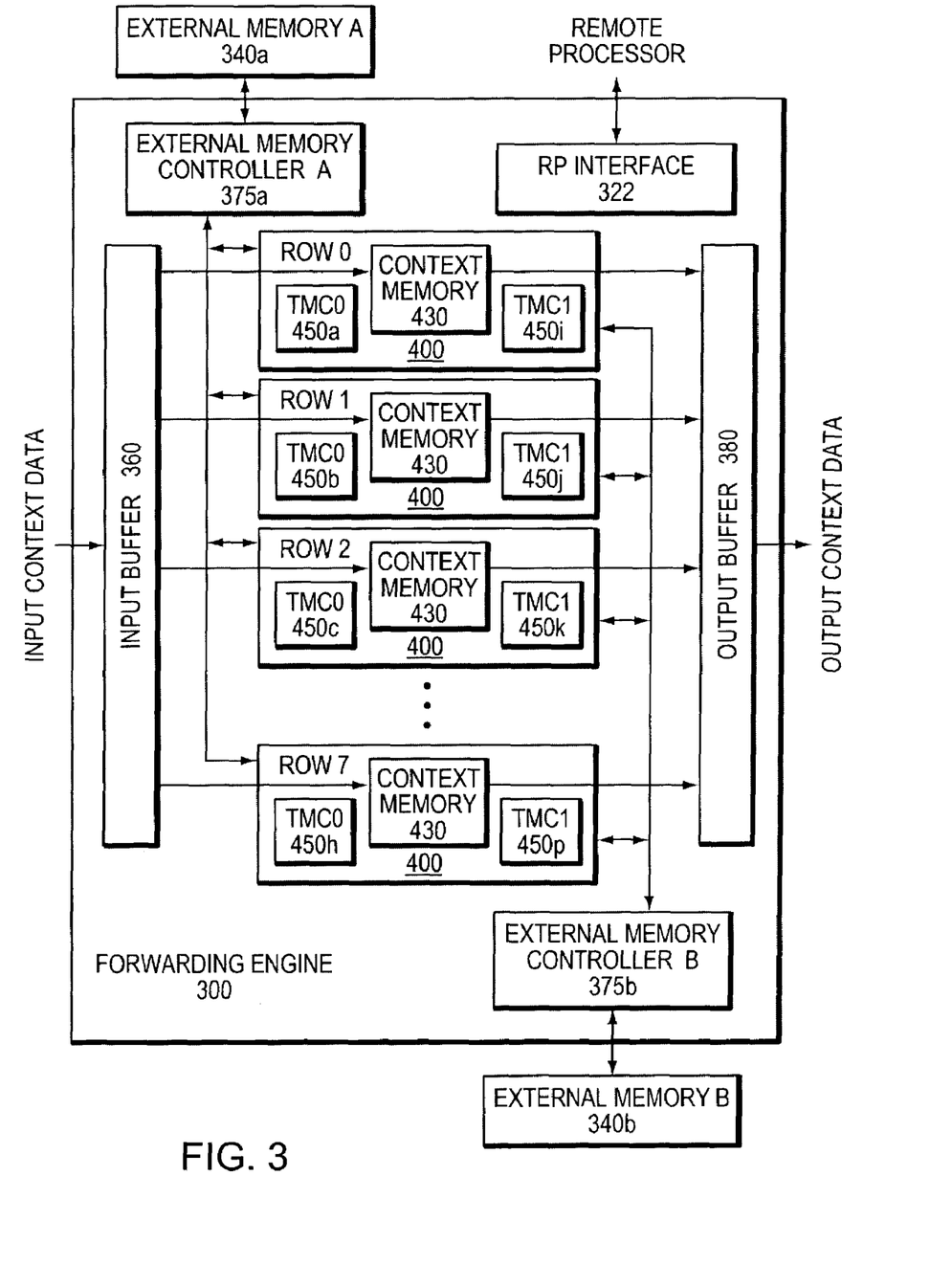
FIG. 3 is a partial schematic block diagram of the arrayed-processing engine comprising a symmetric multiprocessor system configured as a multi-dimensioned systolic array that may be advantageously used with the present invention.

The forwarding engine 300 may comprise a symmetric multiprocessor system having a plurality of processing elements or processors. FIG. 3 is a partial schematic block diagram of forwarding engine 300 comprising a plurality of processors (TMCs) 450 organized as a multi-dimensional systolic array. Each processor 450 is preferably a pipelined processor that includes, inter alia, a plurality of arithmetic logic units (ALUs) and a register file having a plurality of general purpose registers that store intermediate result information processed by the ALUs. The processors 450 may be arrayed into multiple rows and columns. In the illustrative embodiment, the processors are arrayed as eight (8) rows and two (2) columns in an 8×2 arrayed configuration that is embedded between an input buffer 360 and an output buffer 380. However, it should be noted that other arrangements, such as 4×4, 4×8, or 8×1-arrayed configurations, may be advantageously used with the present invention. As noted herein, a system, containing e.g., a single processor, supporting multiple threads of execution can take advantage of the invention.

The forwarding engine 300 is coupled to a plurality of external memory resources 340 via associated external memory controllers 375. For example, external memory 340a is coupled to the forwarding engine 300 via its associated memory controller 375a. The external memory 340 is preferably organized as one or more banks and implemented using reduced-latency-dynamic-random-access-memory (RLDRAM) devices, although other devices, such as fast-cycle-random-access-memory (FCRAM) devices, could be used. The external memory 340 stores non-transient data (e.g., forwarding tables, queues) organized as a series of data structures for use in processing transient data (e.g., packets). Each memory controller 375 contains logic that enables access to memory locations contained in its associated external memory 340.

The processors 450 of a particular column are coupled to a particular external memory controller 375 that enables the processors 450 to share and access data contained in the external memory 340 coupled to the controller 375. For example, the processors 450 that comprise column TMC0, i.e., processors 450a-h, are coupled to external memory controller 375a, which enables each of these processors to share and access data contained in external memory 340a.

Figure 4:
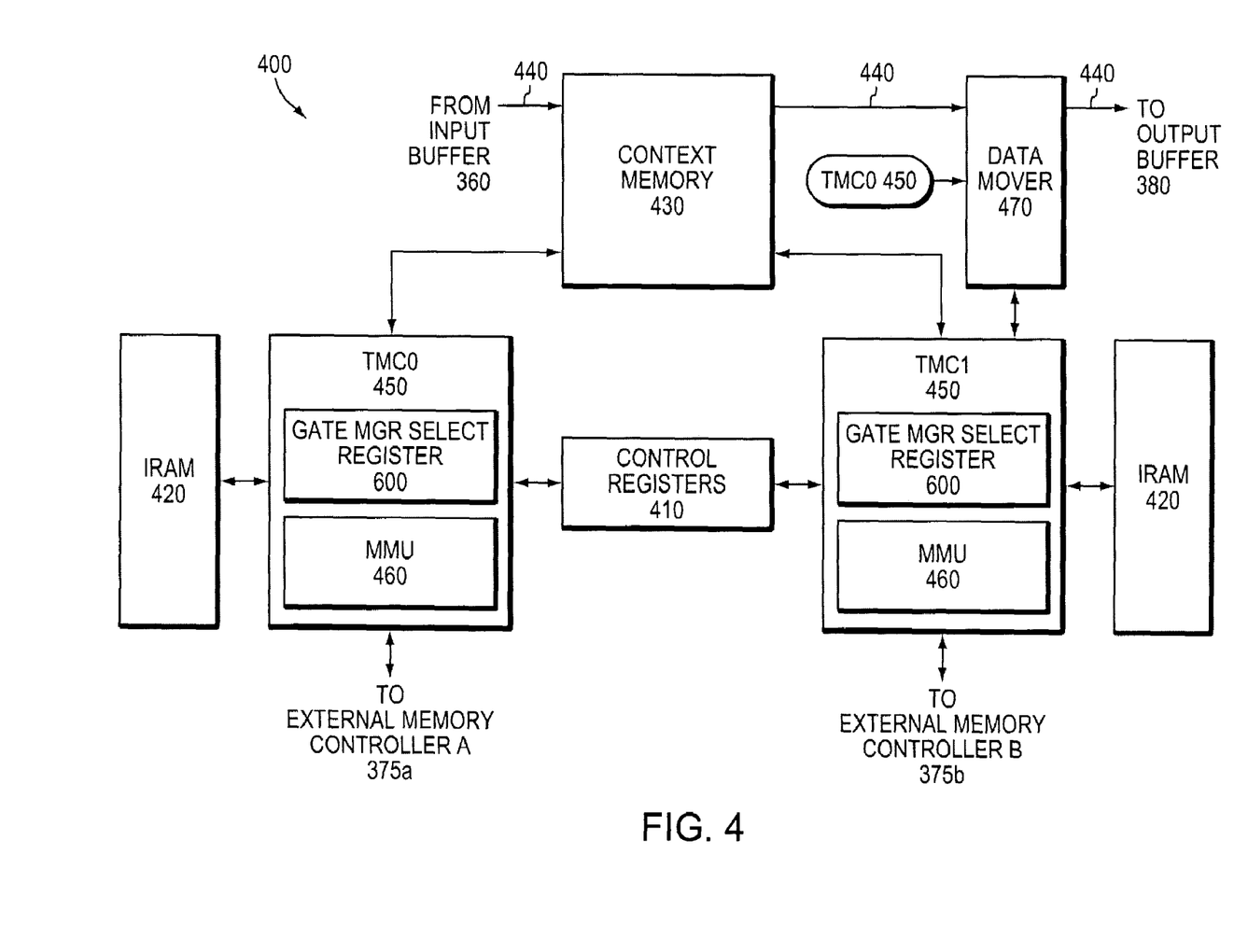
FIG. 4 is a schematic block diagram of a processor cluster of the arrayed-processing engine that may be advantageously used with the present invention.

The processors 450 of a row, e.g., processors 450a and 450i, are organized as a cluster 400 containing a context memory 430 configured to hold context information (e.g., packet headers) processed by the processors 450. FIG. 4 is a schematic block diagram of a cluster 400. Each processor 450 of the cluster is coupled to an instruction memory (IRAM) 420 that is configured to store instructions for execution by the processor 450, a control registers unit 410, and the context memory 430. The control registers unit 410 comprises various general-purpose and control registers used for storage and to control the operation of the TMCs 450, respectively. Each processor 450 contains an MMU 460 that couples the processor 450 to the memory controller 375 and enables the processor 450 to access the external memory 340 coupled to the controller 375.

The processors 450 of each cluster 400 execute operations on transient data loaded into the context memory 430 by the input buffer 360, whereas the processors of each column operate in parallel to perform substantially the same operation on the transient data, but with a shifted phase. Transient (context) data are passed between the input and output buffers of the engine 300 over a data path channel 440 provided by a data mover circuit 470 coupled to the processor 450. The context data flowing through the cluster 400 are stored in the context memory 430 along with other data and pointers that reference data and various data structures (e.g., tables) stored in, e.g., external memory 340, for use by the processor 450. The data mover 470 comprises logic that enables data to be transferred from the context memory 430 to the output buffer 380.

The present invention relates to an efficient technique for maintaining order among entities, such as processors 450, by ensuring orderly access to resources shared by the entities, such as memories 340. According to the technique, a request is generated to access a resource. The request is placed on a queue associated with an entity. Each queue is further associated with an ID that illustratively represents the entity associated with the queue. The request eventually reaches the head of the queue. Notably, a gate manager is provided to maintain orderly access to the shared resource. To that end, the gate manager generates an ID that illustratively represents an entity that is allowed to access the resource. The ID generated by the gate manager is compared with the ID associated with the queue to determine if they match. If so, the request is transferred to the resource, which processes the request. Results acquired from the resource (if any) are transferred to the entity.

Figure 5:
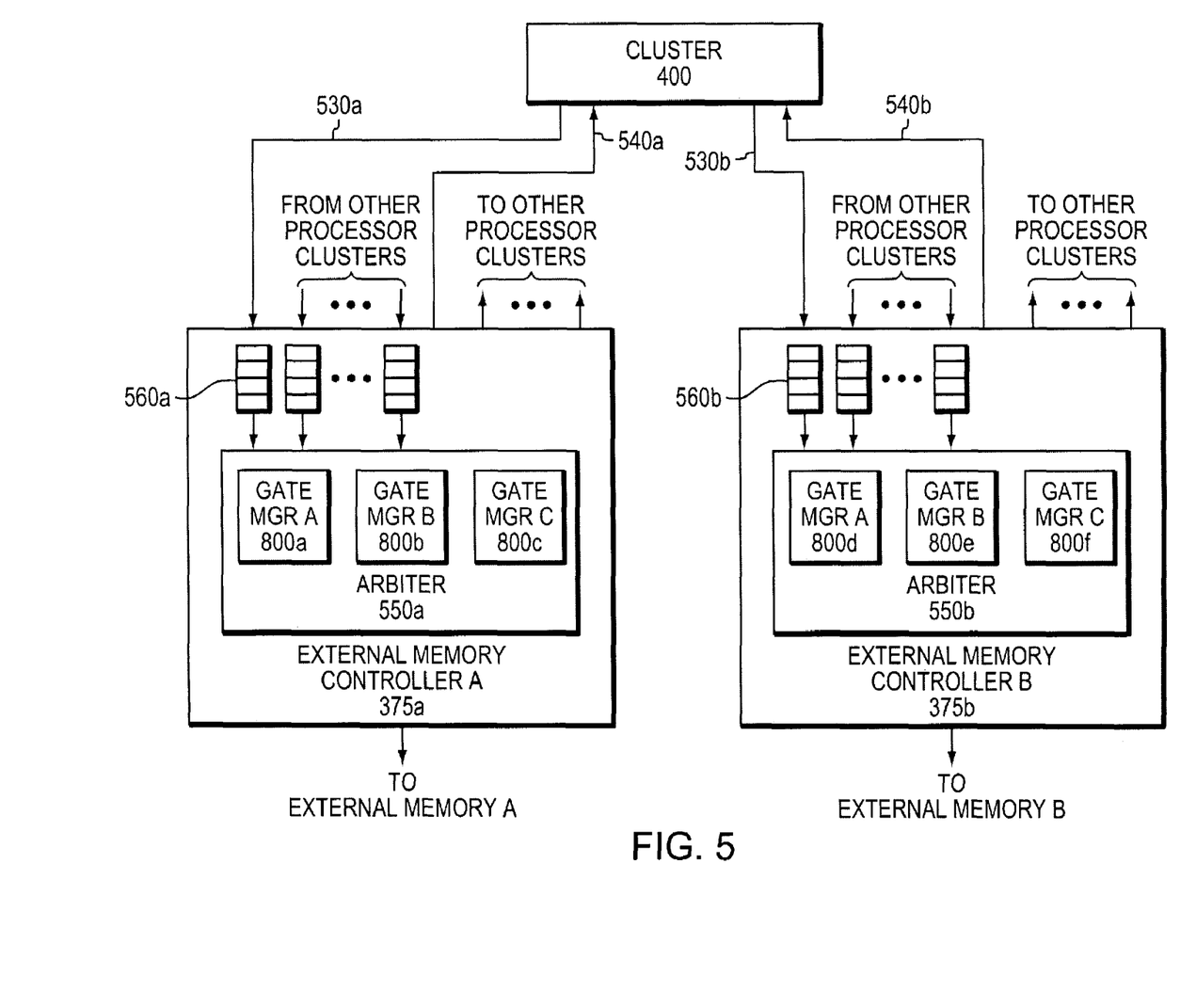
FIG. 5 is a schematic block diagram of a processor cluster coupled to a plurality of memory controllers that may be advantageously used with the present invention.

FIG. 5 is a schematic block diagram of a cluster 400 coupled to a plurality of external memory controllers 375. Each memory controller 375 contains a plurality of request queues 560 coupled to an arbiter 550. Each request queue 560 is illustratively a first-in-first-out (FIFO) queue that is associated with a processor 450 and is configured to hold requests transferred from the processor 450. Further, each request queue 560 is associated with an identifier (ID) that illustratively represents the processor 450 associated with the queue 560. The arbiter 550 contains conventional logic that implements a conventional arbitration policy to select queues 560 and process requests at the head of the selected queues 560. Arbiter 550 contains gate managers 800, which are configured to generate identifiers (IDs) used by the arbiter 550 to process requests at the head of queues 560 in accordance with the inventive technique.

Figure 6:
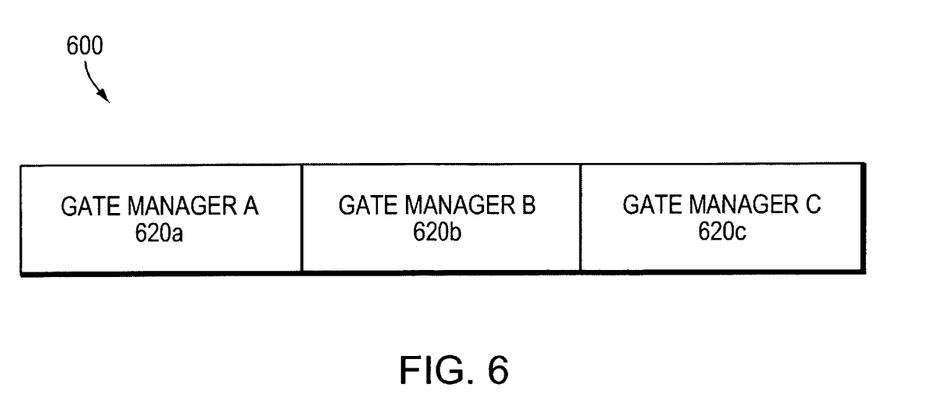
FIG. 6 is a schematic block diagram of a gate manager selection register that may be advantageously used with the present invention.

Each processor 450 (FIG. 4) illustratively contains a gate manager (MGR) select register 600 that the processor 450 configures to specify (select) one or more gate managers 800 associated with the processor 450. FIG. 6 is a schematic block diagram of a gate manager select register 600 that may be advantageously used with the present invention. Register 600 contains gate manager fields 620*a-c*, each of which is illustratively a one-bit field associated with a particular gate manager 800 and holds a value that associates the gate manager to the processor. For example, fields 620*a-c* hold values that associates the processor 450 to gate managers A-C, respectively. A gate manager 800 is associated with the processor 450 by illustratively asserting its corresponding bit in field 620 to e.g., a one. For example, asserting bits contained in fields 620*a* and 620*c* specifies that gate managers A and C are associated with the processor 450. The content of the gate manager select register 600 is transferred to the memory controller 375 coupled to the processor 450 via bus 530. Thus, for example, the contents of the gate manager select registers 600 contained in processors 450*a-h* are transferred to external memory controller 375*a* via bus 530*a*.

Figure 7:
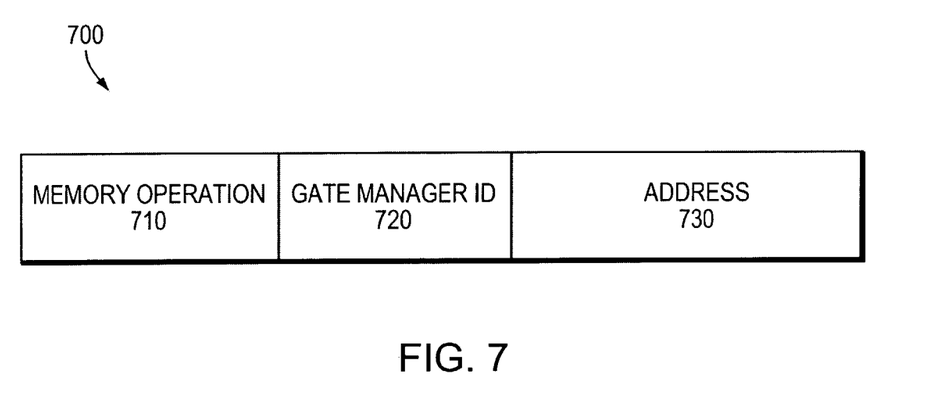
FIG. 7 is a schematic block diagram of a request that may be advantageously used with the present invention.

Processor 450 accesses an external memory 340 by generating a request and transferring the request to the memory controller 375 associated with the memory. FIG. 7 is a schematic block diagram of a request 700 that may be advantageously used with the present invention. Request 700 contains a memory operation field 710, a gate manager identifier (ID) field 720, and an address field 730. The memory operation 710 and address 730 fields hold values that represent a memory operation, e.g., read or write, to be performed to access the memory, and a memory address where the operation is to be performed, respectively. The gate manager ID field 720 holds a value that represents, inter alia, a gate manager 800 to be used to process a request. Illustratively, field 720 is a two-bit field that holds a value between 0 and 3, where a zero indicates no gate manager is to be used and a non-zero value (e.g., 1 through 3) specifies (selects) a particular gate manager 800. For example, a request 700 containing a value of 1 in the gate manager ID field 720 indicates gate manager A is used to process the request 700. Likewise, a request 700 containing a value of zero in field 720 indicates no gate manager is used to process the request 700.

Figure 8:
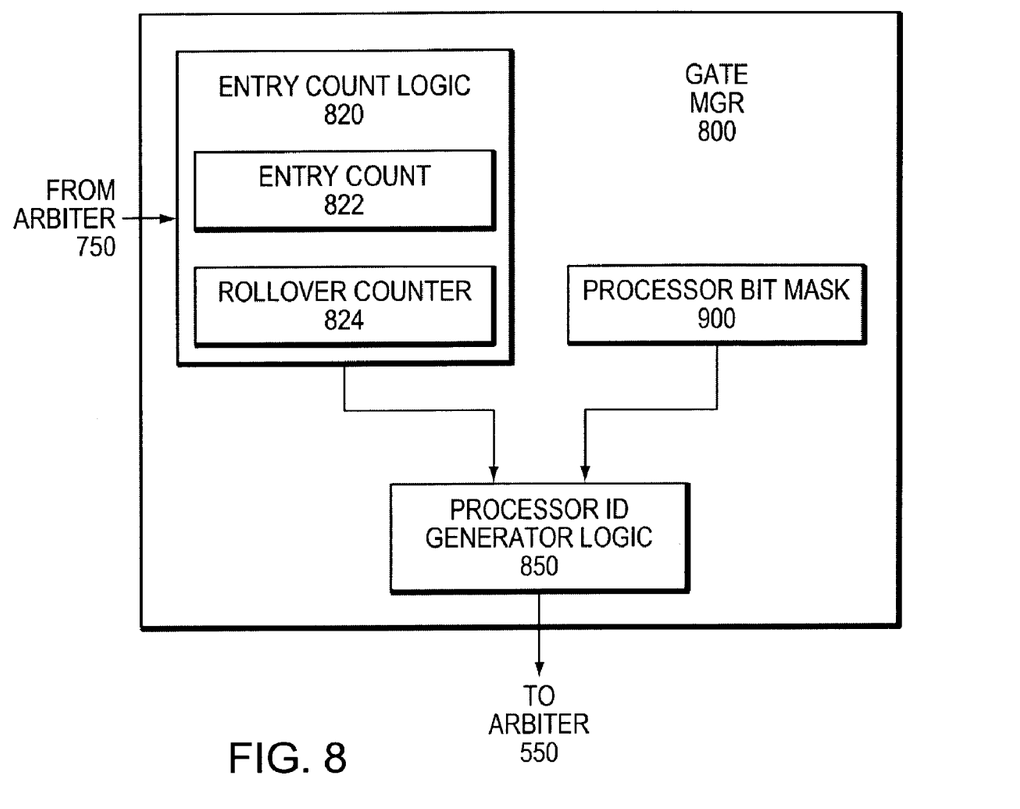
FIG. 8 is a high-level schematic block diagram of a gate manager that may be advantageously used with the present invention.

FIG. 8 is a schematic block diagram of a gate manager 800 that may be advantageously used with the present invention. Gate manager 800 contains entry count logic 820, a processor bit mask 900, and processor identifier (ID) generator logic 850. Entry count logic 820 comprises an entry count 822 and a rollover counter 824. The entry count 822 holds a value that is a count of the number of processors in a particular column that have specified (selected) the gate manager 800 in their gate manager select register 600. The rollover counter 824 is a conventional rollover counter that generates a value illustratively from 1 to the number of processors represented by the entry count 822.

Figure 9:
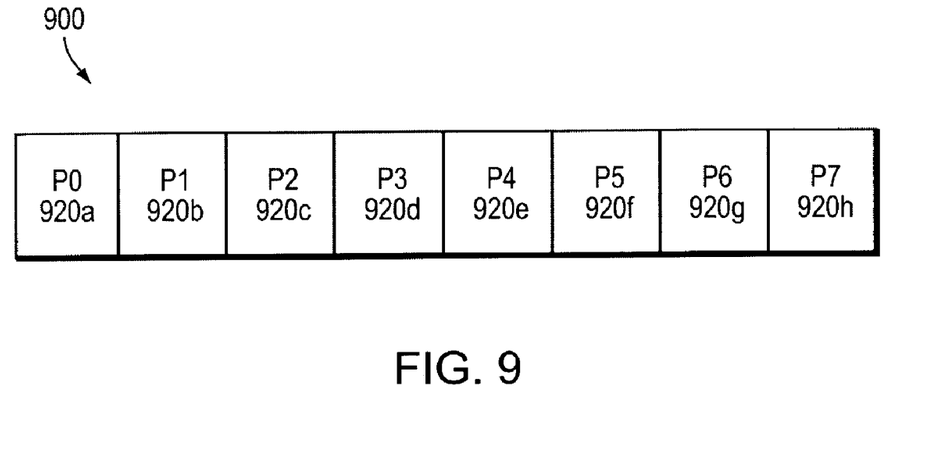
FIG. 9 is a schematic block diagram of a processor bit mask that may be advantageously used with the present invention.

Processor bit mask 900 is, illustratively, an 8-bit bit mask that indicates whether a particular processor in a column has specified (selected) the gate manager in the processor's gate manager select register 600. FIG. 9 is a schematic block diagram of a processor bit mask 900 that may be advantageously used with the present invention. Each processor 450 is represented by, illustratively, a one-bit field 920 that indicates whether the processor has specified the gate manager 800. For example, fields P0 920*a*, P1 920*b*, P2 920*c*, and P7 920*h* of the bit mask 900 contained in gate manager 800*a* represent (correspond to) processors 450*a*, 450*b*, 450*c*, and 450*h*, respectively and indicate whether those processors have specified the gate manager 800*a* in their gate manager select registers 600. Illustratively, a value of one in field 920 indicates the processor 450 has specified the gate manager 800 and a value of zero indicates the processor 450 has not specified the gate manager 800.

The processor ID generator logic 850 combines the value generated from the rollover counter 824 with the processor mask 900 to generate an identifier (ID) that represents a processor 450. Specifically, logic 850 acquires the value generated by the rollover counter 824, applies the generated value to the processor bit mask 900 to determine the processor 450 associated with the generated value, and generates an ID that represents the processor 450. This generated ID is transferred to the arbiter 550.

For example, suppose processors 450*a*, 450*b*, and 450*h* specify gate manager 800*a* in their gate manager select registers 600 and the content the each processor's gate manager select register 600 is transferred to memory controller 375*a*. Gate manager 800*a* acquires the transferred contents and configures its entry count logic 820 to generate count values 1, 2, and, 3, corresponding to processors 450*a*, 450*b*, and 450*h*. In addition, gate manager 800*a* configures its processor bit mask 900 to represent these processors by, illustratively, setting bits P0 920*a*, P1 920*b*, and P7 920*h* in its processor bit mask 900 to a one. Now suppose the rollover counter 824 generates a value of 3, representing processor 450*h*. The processor ID generator logic 850 applies this value to the processor bit mask 900 and determines that the value generated by the counter 824 corresponds to processor 450*h*. That is, the processor ID generator logic 850 determines from examining the processor bit mask 900 that processor 450*h* is, illustratively, the third processor starting from bit P0 920*a* that has selected gate manager 800*a* in its processor gate manager select register 600. Logic 850 then generates an ID representing processor 450*h*, which is transferred to the arbiter 550.

As noted above, a processor 450 accesses a memory 340 via requests 700. Specifically, the processor 450 accesses a memory 340 by generating a request 700 and transferring the request 700 to the appropriate external memory controller 375 coupled to the memory 340. The memory controller 375 places the request 700 at the end (tail) of the queue 560 associated with the processor 450.

Eventually, the request 700 reaches the top (head) of the queue 560 and the arbiter 550 processes the request. Specifically, the arbiter 550 implements a conventional "polling" algorithm that polls the queues 560 in, e.g., a round robin fashion, selects the queue 560 containing the request, and determines that the request 700 is at the head the selected queue 560. The arbiter 550 then processes the request 700 including examining the content of the request's gate manager ID field 720 and determining if a gate manager 800 has been specified. If not, the request is removed from the queue and transferred to the external memory 340 coupled to the memory controller 375. Otherwise, the arbiter 550 determines if the ID generated by the specified gate manager 800 is the same as the ID associated with the queue 560. If so, the arbiter 550 removes the request 700 from the queue 560 and transfers it to the external memory 340 coupled to the memory controller 375. Otherwise, the request 700 remains at the head of the queue 560.

When the arbiter 550 transfers a request 700 from a queue 560 to the memory 340 it sends a signal to the entry count logic 820 to update the rollover counter 824. Logic 850 then generates an ID based on the updated counter's value, as described above. For example, suppose the value in the rollover counter 824 for gate manager 800a is 1 and a request containing a gate manager ID associated with gate manager 800a is at the head of queue 560a. Further, suppose the gate manager 800a generates an ID that is the same as the ID associated with queue 560a. The arbiter 550 (i) polls the queue 560a, (ii) determines the ID generated by the gate manager 800a is the same as the ID associated with queue 560a, (iii) removes the request from the queue 560a, (iv) transfers the request 700 to memory 340a, and (v) notifies the entry count logic 820 to update the rollover counter's value to, e.g., a value of 2. The gate manager 800 then generates an ID based on the updated rollover counter value, e.g., generates an ID that is the same as the ID associated with processor 450b's queue 560.

Figure 10:
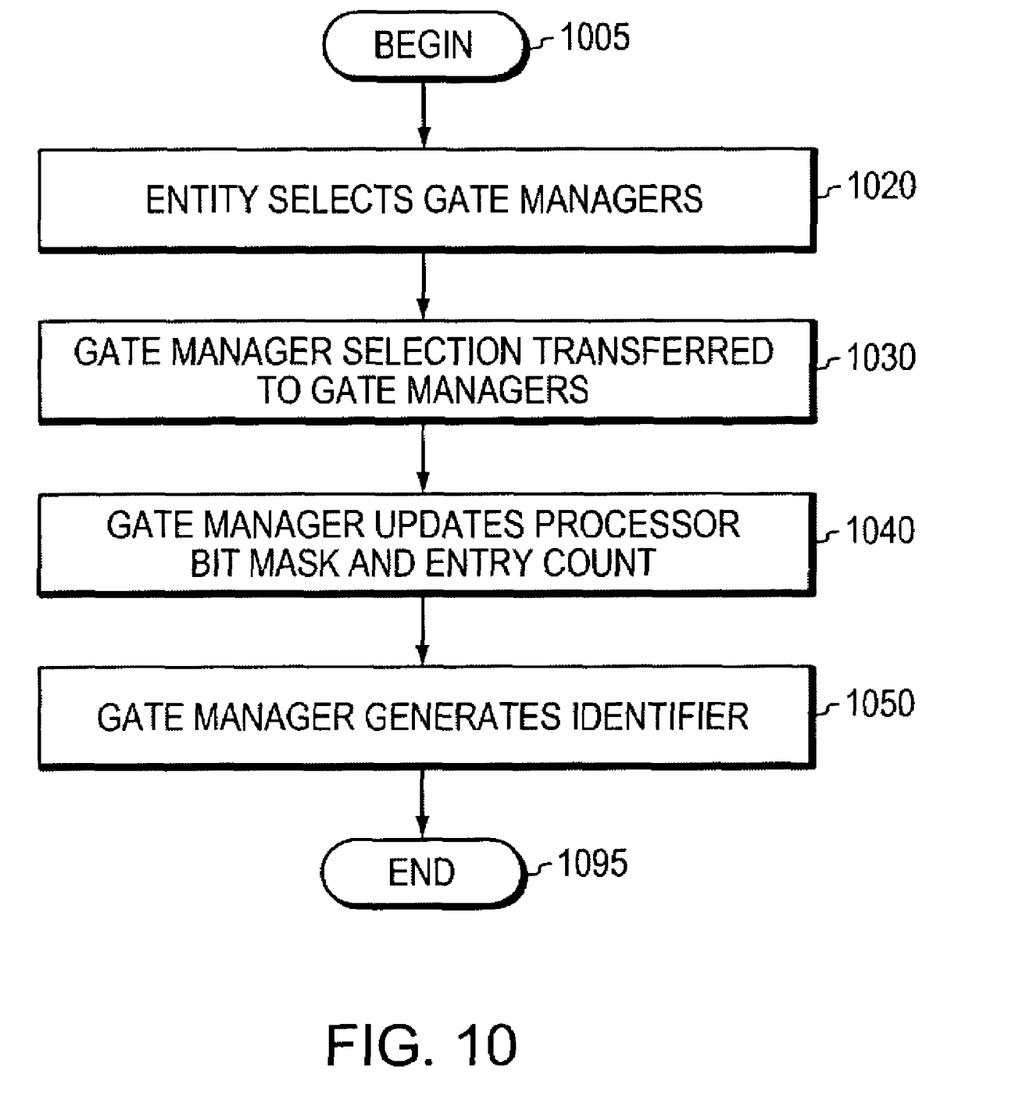
FIG. 10 is a flow diagram of a sequence of steps that may be advantageously used to select and configure a gate manager in accordance with the present invention.

As noted above, a processor 450 selects one or more gate managers 800 by placing an appropriate value in its gate manager select register 600. The register's content is transferred to the memory controller 375 coupled to the processor where the selected gate managers 800 acquire the content and configure the entry count logic 820 and processor bit mask 900, as described above. FIG. 10 is a flow diagram of a sequence of steps that may be used to configure the entry count logic 820 and processor bit mask 900 in accordance with the inventive technique. The sequence begins at Step 1005 and proceeds to Step 1020 where an entity, such as processor 450, selects one or more gate managers 800 by placing an appropriate value in the gate manager selection register 600, as described above. For example, processor 450a selects gate managers 800a, and 800c, by illustratively placing a value of five in its gate manager select register 600. At Step 1030, the content of the gate manager selection register 600 is transferred to the external memory controller 375, coupled to the processor 450, which in turn, transfers the register's 600 contents to the gate managers 800. Thus, in the above example, the content of processor 450a's gate manager selection register 600, e.g., five, is transferred to external memory controller 375a, which transfers this content to gate managers 800a, 800b, and 800c. At Step 1040, each gate manager 800 updates their entry counts 822 and processor bit masks 900 based on the transferred gate manager selection register's 600 content. Thus, in the above example, gate managers 800a and 800c update their entry counts 822 and processor bit masks 900 to reflect the content of processor 450a's gate manager select register 600 by, e.g., incrementing their entry counts 822 by one and setting field P0 920a in their bit masks to one. At Step 1050, each gate manager 800 generates an ID using the processor bit mask 900 and the entry count logic 820, as described above. The sequence ends at Step 1095.

Figure 11:
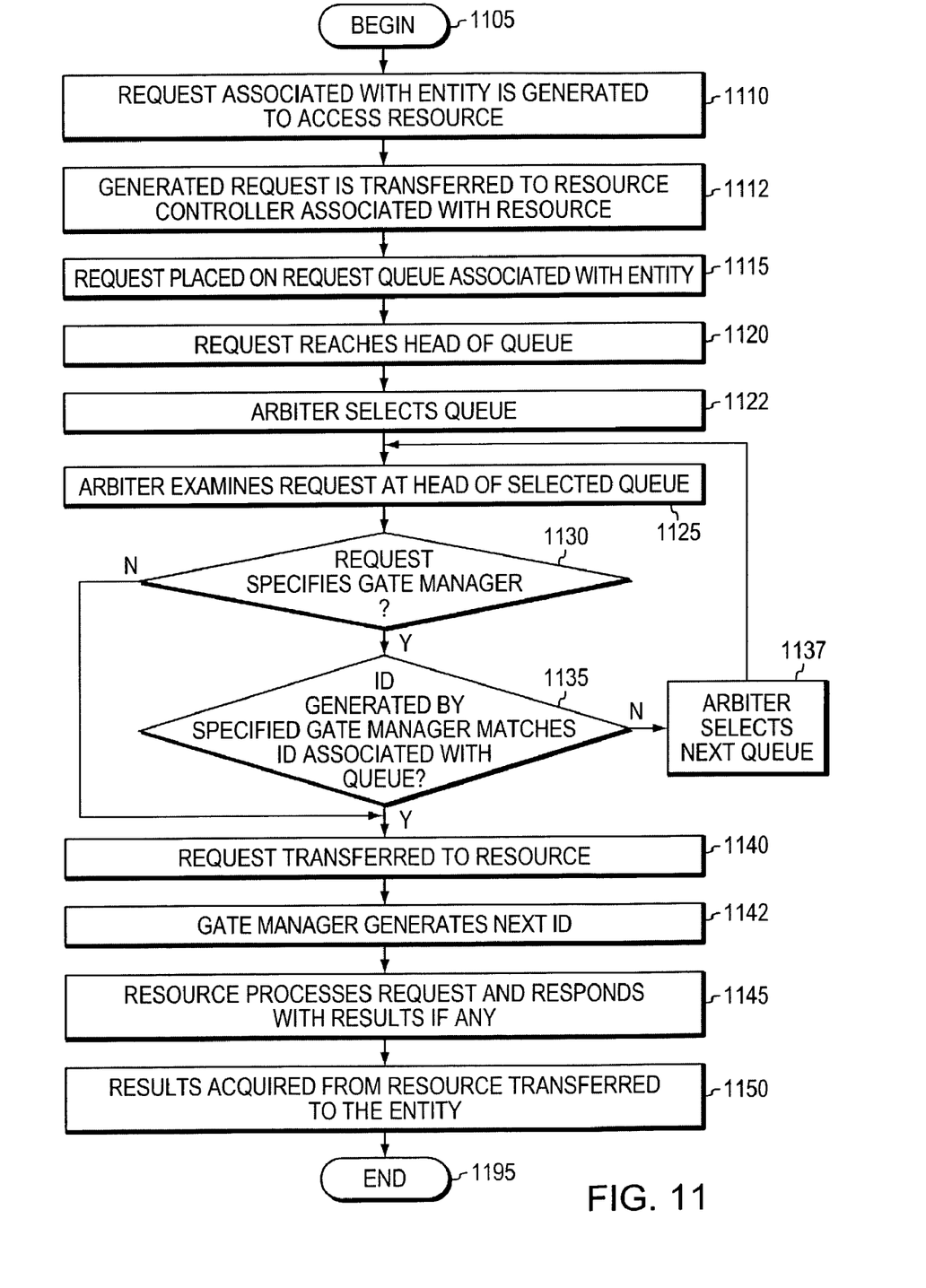
FIG. 11 is a flow diagram of a sequence of steps that may be advantageously used to process a request in accordance with the present invention.

FIG. 11 is a flow diagram of a sequence of steps that may be used to process a request 700 in accordance with the inventive technique. The sequence begins at Step 1105 and proceeds to Step 1110 where a request 700 associated with an entity, e.g., processor 450, is generated to access a resource, e.g., memory 340. The generated request 700 is transferred from the entity to the resource controller associated with the resource, e.g., the memory controller 375 coupled to the memory 340 (Step 1112). At Step 1115, the resource controller places the request 700 on the request queue 560 associated with the entity. At Step 1120, the request reaches the head of the queue 560. The arbiter 550 polls the queues 560 in a manner as described above, selects the queue 560 containing the request 700, and examines the gate manager field 720 in the request 700 to determine if the request 700 specifies a gate manager (Steps 1122-1130). If not, the sequence proceeds to Step 1140. Otherwise, the sequence proceeds to Step 1135 where the arbiter 550 determines if the identifier (ID) generated by the gate manager specified in the request 700 is the same as the ID associated with the queue 560. If not, the arbiter selects the next queue 560, in a manner as described above, and returns to Step 1125.

Otherwise, the sequence proceeds to Step 1140, where the resource controller removes the request 700 from the queue 560 and transfers the request 700 to the resource. At Step 1142, the gate manager is notified by the resource controller that the request has been transferred to the resource and the gate manager generates the next ID, in a manner as described above. The resource processes the request 700 and responds to the resource controller with results, if any (Step 1145). For example, if the request's memory operation field 710 specified a read operation, memory 340 processes the request including responding with (returning) data read contained in the location represented in the request's address field 730. Moreover, if the request's memory operation is a write operation, memory 340 processes the request but does not respond. At Step 1150, the resource controller transfers the results (if any) acquired from the resource to the entity. The sequence ends at Step 1195.

Although the above-described embodiment of the invention describes the invention as used in a system containing a plurality of gate managers, this is not intended to be a limitation of the invention. Rather, a system employing a single gate manager may take advantage of the inventive technique. Moreover, the above-described embodiment of the invention describes the invention as used in a system containing one or more memories as resources. However, this too is not intended to be a limitation of the invention. Rather, the inventive technique may be applied to other types of resources shared by a plurality of entities, such as an input and/or output device.

As noted above, a system supporting multiple threads of execution can take advantage of the inventive technique. Here, the invention may be implemented in whole or in part in software comprising computer executable code stored in a computer readable medium, such as a flash RAM or a disk file. For example, in one embodiment of the invention, threads of execution generate requests 700 that are transferred to a resource controller (e.g., memory controller 375) implemented as a software routine that processes the requests as described above.

In other embodiments of the invention, the entity is "blocked" from execution while the request is processed. For example, in an embodiment of the invention, the entity is a thread of execution that generates and transfers request to a resource controller. While the request is processed, the thread of execution is blocked from further execution. If the request contains an operation that does not return results from the resource (e.g., a write operation), the resource controller notifies a scheduler contained in the system when the request is transferred to the resource (e.g., a memory). If the request contains an operation that returns results the resource (e.g., a read operation), the resource controller transfers the results to the thread and notifies the scheduler. When the scheduler receives the notification, it unblocks the thread and reschedules it for execution.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. A method for maintaining order among a plurality of entities contained in an intermediate node, the intermediate node having a plurality of gate managers, the method comprising the steps of:

generating a request to access a resource shared by the entities, wherein the request includes a gate manager identifier field for holding a value that specifies a gate manager of the plurality of gate managers;

placing the request on a queue associated with an entity;

examining the gate manager identifier field to determine if it specifies a gate manager; and if not, transferring the request to the resource;

otherwise, determining if an identifier generated by one of the gate managers matches an identifier associated with the queue; and if so, transferring the request to the resource.

2. The method as defined in claim 1 wherein the entity is a processor.

3. The method as defined in claim 1 wherein the entity is a thread of execution.

4. The method as defined in claim 1 wherein the resource is a memory.

5. The method as defined in claim 1 wherein the intermediate node comprises a gate manager select register configured to associate one or more gate managers in the plurality of gate managers with the entity.

6. The method as defined in claim 5 comprising the steps of:

associating the gate manager with the entity by selecting the gate manager in the gate manager select register; and transferring the content of the gate manager selection register to the gate manager.

7. A method for maintaining order among a plurality of entities contained in an intermediate node, comprising the steps of:

generating a request to access a resource shared by the entities;

placing the request on a queue associated with an entity;

determining if an identifier generated by a gate manager matches an identifier associated with the queue; and if so, transferring the request to the resource;

blocking the entity from further execution;

acquiring results from the resource;

transferring the results to the entity; and unblocking the entity from further execution after the results are transferred to the entity.

8. The method as defined in claim 7 wherein the intermediate node comprises a plurality of gate managers and the gate manager is one of the gate managers in the plurality of gate managers.

9. The method as defined in claim 5 wherein the request comprises a gate manager identifier that holds a value that specifies a gate manager in the plurality of gate managers.

10. The method as defined in claim 7 wherein the entity is a processor and the resource is a memory.

11. An apparatus comprising:

a shared resource;

a plurality of entities configured to generate requests to access the shared resource;

a plurality of queues wherein each queue is associated with a particular entity and is configured to hold requests generate by the associated entity;

a gate manager configured to generate an identifier (ID) representing an entity in the plurality of entities; and a resource controller configured to select a queue from the plurality of queues, determine if a request at the head of the selected queue specifies the gate manager, and, if not, transfer the request to the shared resource, and if so, determine if an ID associated with the queue matches the ID generated by the gate manager and, if so, transfer the request at the head of the selected queue to the shared resource.

12. The apparatus as defined in claim 11 wherein the entity is a processor.

13. The apparatus as defined in claim 11 wherein the resource is a memory.

14. The apparatus as defined in claim 11 wherein the resource controller is further configured to acquire results from the resource and transfer the results to the entity.

15. The apparatus of claim 14 wherein the resource controller is further configured to block the entity from further execution while the request is being processed, and then unblock the entity after the results are transferred to the entity.

16. The apparatus of claim 11 further comprising:

a gate manager select register configured to indicate association of the gate manager with the entity.

17. An intermediate node comprising:

means for generating a request to access a resource shared by a plurality of entities;

means for placing the request on a queue associated with an entity of the plurality of entities;

means for determining if an identifier (ID) generated by a gate manager matches an ID associated with the queue;

means for transferring the request to the resource if the ID generated by the gate manager matches the ID associated with the queue;

means for blocking the entity from further execution;

means for acquiring results from the resource;

means for transferring the results to the entity;

means for unblocking the entity from further execution after the results are transferred to the entity.

18. A computer readable medium comprising computer executable instructions for execution in a processor for:

generating a request to access a resource shared by a plurality entities, wherein the request includes a gate manager identifier field for holding a value that specifies a gate manager of a plurality of gate managers;

placing the request on a queue associated with an entity;

examining the gate manager identifier field to determine if it specifies a gate manager; and if not, transferring the request to the resource;

otherwise, determining if an entity represented by an identifier generated by one of the gate managers matches the entity associated with the queue; and if so, transferring the request to the resource.

19. A method for maintaining order among a plurality of entities contained in an intermediate node, the method comprising the steps of:

generating a request to access a resource shared by the entities;

placing the request on a queue associated with an entity;

examining the request to determine if the request specifies a gate manager, and, if not transferring the request to the resource, and if a gate manager is specified, generating a identifier by the specified gate manager, wherein the identifier represents an entity allowed access to the shared resource, and comparing the identifier generated by the specified gate manager to the identifier associated with the queue, and, if they match transferring the request to the resource.

20. The method as defined in claim 19 wherein the entity is a processor and the resource is a memory.

21. An intermediate node comprising:
means for generating a request to access a resource shared by a plurality of entities;
means for placing the request on a queue associated with an entity;
means for examining the request to determine if the request specifies a gate manager, and, if not, transferring the request to the resource;
means for, if a gate manager is specified, generating a identifier by the specified gate manager, wherein the identifier represents an entity allowed access to the shared resource, and comparing the identifier generated by the specified gate manager to the identifier associated with the queue, and if they match, transferring the request to the resource.

* * * * *